United States Patent [19]

Lee, Jr.

[11] Patent Number: 4,570,485
[45] Date of Patent: Feb. 18, 1986

[54] METHOD OF AND APPARATUS FOR THE HYDROSTATIC TESTING OF THREADED PIPE

[76] Inventor: Roy Lee, Jr., 10134 Briar Dr., Houston, Tex. 77042

[21] Appl. No.: 472,717

[22] Filed: Mar. 7, 1983

[51] Int. Cl.[4] ............................................. G01M 3/28
[52] U.S. Cl. ...................................... 73/49.5; 73/49.1
[58] Field of Search ...................... 73/49.5, 49.6, 49.1, 73/46

[56] References Cited

U.S. PATENT DOCUMENTS

| | | | |
|---|---|---|---|
| 2,231,807 | 2/1941 | Hybarger | 73/49.6 |
| 2,293,471 | 8/1942 | Protin | 73/49.6 |
| 2,896,445 | 7/1959 | McNabb | 73/49.6 |
| 2,947,165 | 8/1960 | Kirchner et al. | 73/49.5 X |
| 2,983,137 | 5/1961 | Lombard | 73/49.6 X |
| 3,095,729 | 7/1963 | McConnell | 73/49.5 |
| 3,710,628 | 1/1973 | Horton | 73/49.5 |
| 4,067,228 | 1/1978 | Elle et al. | 73/49.5 |
| 4,182,160 | 1/1980 | Powers et al. | 73/49.5 |
| 4,237,723 | 12/1980 | Kent | 73/49.6 |
| 4,362,049 | 12/1982 | Horton | 73/49.6 |
| 4,381,800 | 5/1983 | Leslie | 73/49.5 |

FOREIGN PATENT DOCUMENTS

| | | | |
|---|---|---|---|
| 22427 | 12/1961 | German Democratic Rep. | 73/49.1 |
| 539788 | 2/1956 | Italy | 73/49.5 |
| 728009 | 4/1980 | U.S.S.R. | 73/49.5 |

*Primary Examiner*—Stewart J. Levy
*Assistant Examiner*—Hezron E. Williams
*Attorney, Agent, or Firm*—Vaden, Eickenroht, Thompson & Jamison

[57] ABSTRACT

A method of and apparatus for hydrostatically testing threaded pipe is disclosed that moves the pipe into position to have a first end cap made up on one end, moves the pipe into position to have a second end cap made up on the other end, and lowers a shield onto the pipe before it is tested. The apparatus includes a mandrel that is attached to the first end cap. The mandrel is supported and rotated by a socket but can move out of the socket to travel with the pipe as the pipe is moved to receive the second end cap.

10 Claims, 19 Drawing Figures

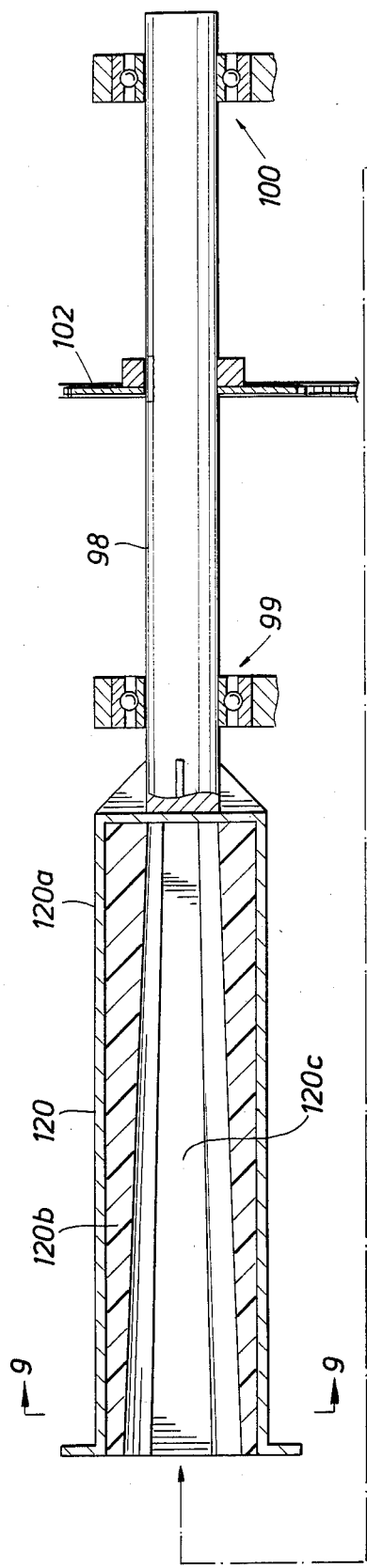
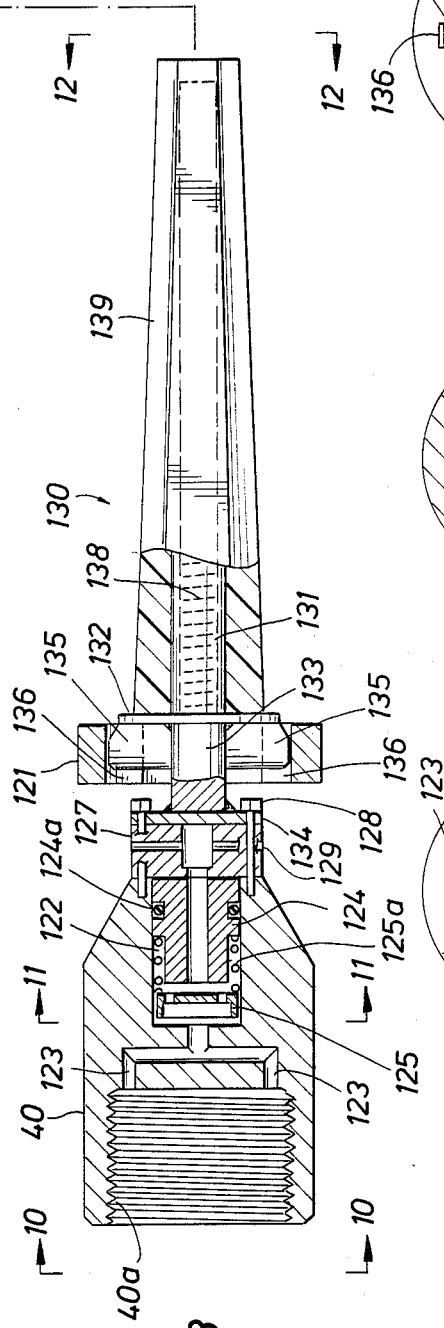
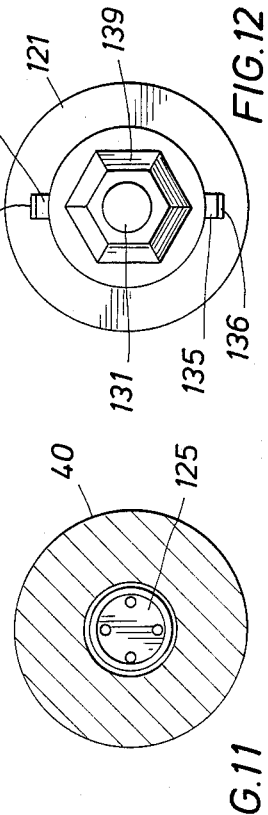
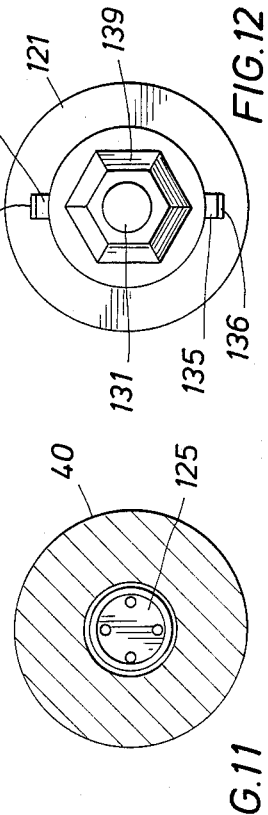
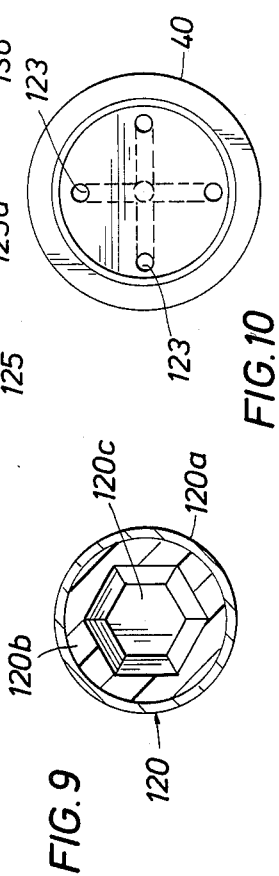

METHOD OF AND APPARATUS FOR THE HYDROSTATIC TESTING OF THREADED PIPE

This invention relates to hydrostatic pipe testing generally, and in particular to the semi-automatic and automatic hydrostatic testing of threaded pipe.

To test threaded pipe hydrostatically, usually threaded end caps are used to close the ends of the pipe. This allows the pipe threads as well as the pipe wall to be tested. In semi-automatic and automatic systems, the end caps are connected to and disconnected from the pipe either semi-automatically under the remote control of the operator or automatically. The end caps and the pipe are moved into position for their threads to engage along substantially fixed paths. If the pipe isn't straight, and it often isn't, the threads on the pipe may not be properly aligned with the threads on the end cap and damage to the threads can result.

It is an object of this invention to provide a method of and apparatus for semi-automatically or automatically hydrostatically testing threaded pipe that allows the pipe and the end caps sufficient freedom to adjust their positions as required to align the threads on the pipe and the end cap before the connection is made up, thereby reducing substantially the chance of damaging the threads on the pipe and the end cap.

The first step in any hydrostatic testing procedure is to move the joint of pipe to be tested onto the test rack. At that point in the operation, the end caps are spaced from the ends of the pipe. The next step is to move the pipe or the end caps or both into position for the end caps to be made up on the ends of the pipe. It is usually easier to move the pipe than the end caps because they are connected to the apparatus used to rotate the end caps to make-up and break-out the connections between the end caps and the threaded ends of the pipe. In addition, the water for hydrostatically testing the pipe is introduced into the pipe through one of the end caps. Preferably, this end cap is the last one to be made up on the pipe and is required to move a minimum distance toward the pipe. This means the other end cap must be connected to the pipe and then travel with the pipe as it moves into position to be connected to the cap through which water is to be pumped into the pipe. For semi-automatic or automatic operation, this means the method and apparatus for supporting the first end cap connected must support the end cap in position to be connected to the pipe, rotate the end cap to make up the threaded connection between the cap and the pipe, and then release the end cap for movement with the pipe as the pipe moves longitudinally into position to be connected to the other end cap.

It is an another object of this invention to provide an improved method of and apparatus for supporting an end cap for connecting the end cap to the pipe and for releasing the end cap for movement with the pipe as the pipe moves into position to be connected to the other end cap.

It is an another object of this invention to provide a method of and apparatus for hydrostatically testing threaded pipe in which the first connected end cap is attached to a mandrel that when in engagement with a socket supports the end cap and transmits rotation of the socket to the end cap to make-up and break-out the connection between the end cap and the pipe and that can move longitudinal out of engagement with the socket to travel with the end cap as the pipe moves longitudinally toward the other end cap.

It is another object of this invention to provide a shield that is lowered onto the pipe to hold the pipe on the test rack during the testing operation and to protect operators of the apparatus for injury should the pipe fail under high pressure.

The shield is very heavy since it must exert a substantial downward force on the pipe to hold the pipe on the test rack and contain the high pressure water in the pipe should the pipe fail therefore, it is another object and feature of this invention to provide a method of and apparatus for holding the shield from inadvertently falling and possibly injuring an operator who, for one reason or another, may have his hands under the shield at that time making some adjustment or correction on the apparatus.

These and other objects, advantages, and features of this invention will be apparent to those skilled in the art from a consideration of this specification including the attached drawings and appended claims.

In the drawings

FIG. 7 is a sectional view through the socket used to support and to rotate the mandrel attached to the first end cap;

FIG. 8 is a sectional view through the mandrel and the first end cap;

FIG. 9 is a sectional view taken along line 9—9 of FIG. 7;

FIG. 10 is an end view of the first end cap taken along line 10—10 of FIG. 8;

FIG. 11 is a sectional view taken along line 11—11 of FIG. 8;

FIG. 12 is an end view of the mandrel taken along line 12—12 of FIG. 8.

Figure 3:
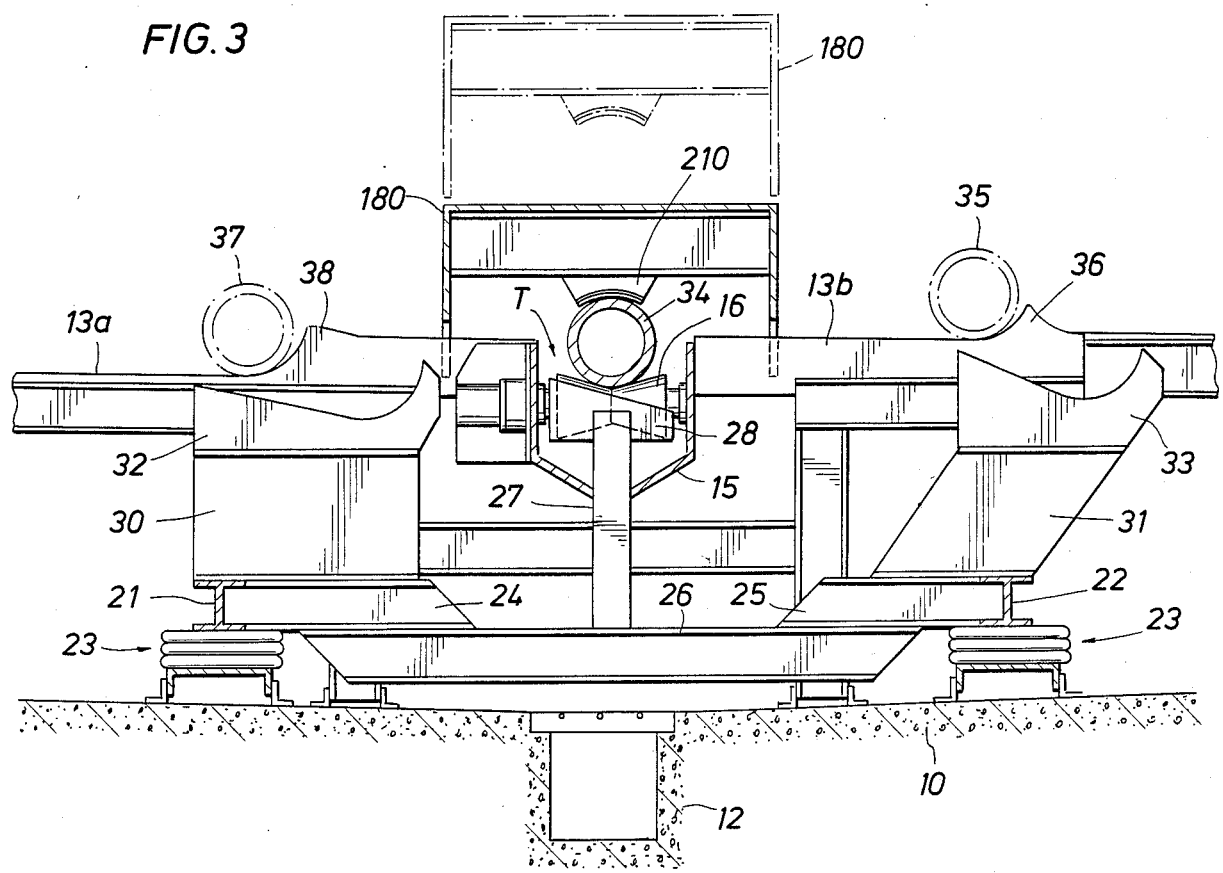
FIG. 3 is a cross sectional view taken along line 3—3 of FIG. 2 with the shield resting on a joint of pipe on the test rack and showing in dotted lines the position of the shield in its raised position.
Figure 4:
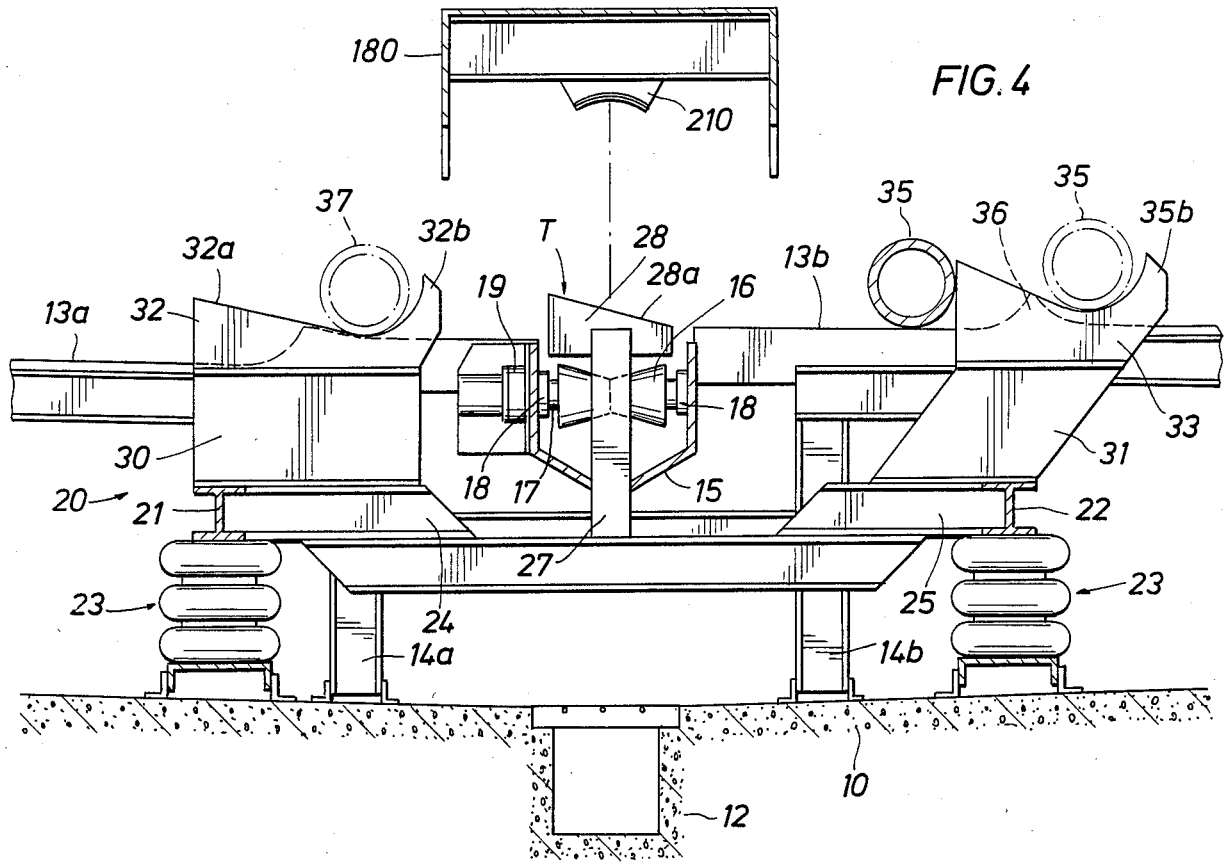
FIG. 4 is the same view as FIG. 3 with the shield raised and the pipe handling portion of the apparatus moving a joint that has been tested off the test rack and moving another joint in position for movement onto the test rack.

Since each pipe joint is filled with water, tested, and then allowed to drain, there is a lot of water spilled on the floor adjacent the test stand. Therefore, preferably the apparatus is located on concrete floor 10 having raised walls 11 to trap the water within the confines of the walls. As shown in FIGS. 3 and 4, the concrete floor slopes toward the middle where elongated sump 12 collects the water for either reuse or disposal.

Spaced, parallel, pipe rails 13a and 13b are located on opposite sides of the test rack generally indicated by the letter "T". Rails 13a support the pipe to be tested on one side of the test rack and rails 13b supports the pipe as it drains and as it moved on to the storage rack. The rails are supported by a plurality of columns 14a and 14b. The test rack includes lower shield 15, which is generally U-shaped in cross section as shown in FIGS. 3 and 4. Its sidewalls are attached to and supported by the ends of pipe rails 13a and 13b. The bottom of the shield is V-shaped and has openings (not shown) through which water may drain out of the shield.

Equally spaced along bottom shield 15 and mounted between its side walls, are a plurality of the tapered rollers 16. The pipe being tested rests on the tapered rollers. Each roller is mounted on shaft 17, which is supported in bearings 18 attached to opposite sides of the bottom shield. The rollers are attached to and rotate with the shaft.

Means are provided to rotate rollers 16 to move the pipe in an axial direction as is required to position the pipe for the end caps to be connected to the ends of the pipe. In the embodiment shown, roller 16 is rotated in the desired direction by hydraulic motor 19. Not all of the rollers need to be powered.

Located adjacent fixed rails 13a and 13b are pipe conveying assemblies 20. As shown in FIGS. 3 and 4, each pipe conveying assembly includes elongated beams 21 and 22 that extend along opposite sides of and parallel to the test rack. The beams are supported by a plurality of inflatable, flexible wall, air cylinders 23, which in turn are supported on concrete base 10. Each pipe conveying assembly includes beams 24 and 25 which are attached at one end to beams 21 and 22 respectively, and extend perpendicularly therefrom. They are connected together by connecting beam 26, which extends under the test rack. Extending upwardly from the center of connecting beam 26 is upright post 27 that extends through an opening in the bottom of bottom shield 15 and supports plate 28. This plate has upper surface 28a that is inclined downwardly to the right so that pipe supported by the plate will fall to the right onto rails 13b.

Above beams 24 and 25 are spacer plates 30 that support pipe engaging plates 32 and 33. The latter plates have on their upper edges surfaces that slope downwardly in the direction that the pipe is to be moved and that curves upwardly adjacent the right hand side of the plate to provide a shoulder to stop pipe from moving off the plate after it rolls down the sloping surface from left to right as shown in FIGS. 3 and 4. Plates 32 and 33 along with plate 28 are moved up and down by air cylinders 23.

In operation, as shown in FIG. 3, pipe 34 is being tested and is supported by test rack 14. At the same time, previously tested pipe 35 is positioned on rail 13b against stop 36 where any water in the pipe can drain out.

Pipe 37 is resting against stop 38 on rail 13a and will be the next pipe tested. After the test of pipe 34 is completed, cylinders 23 are inflated and pipe conveying assemblies 20 are raised to the position shown in FIG. 4. This will cause the downwardly inclined surface 32a on beam 32 to pick up pipe 37 which will roll on surface 32a against stop 32b. At the same time, the inclined surface 28a on plate 28 will lift pipe 34 up until it rolls off its inclined surface onto the top of rail 13b where it rolls downwardly on the rail until it engages the side of plate 33. At the same time, plate 33 has picked up pipe 35 on its inclined surface 35a and the pipe has rolled into engagement with stop 35b. When the pipe conveying assemblies are returned to the position shown in FIG. 3, pipe 35 will be deposited on rail 13b and roll to the storage area; pipe 37 will roll along the top of rail 13a and fall onto test rack rollers 16; and pipe 35, the previously tested pipe, will roll down rail 13b against stop 36 and continue draining.

Figure 2:
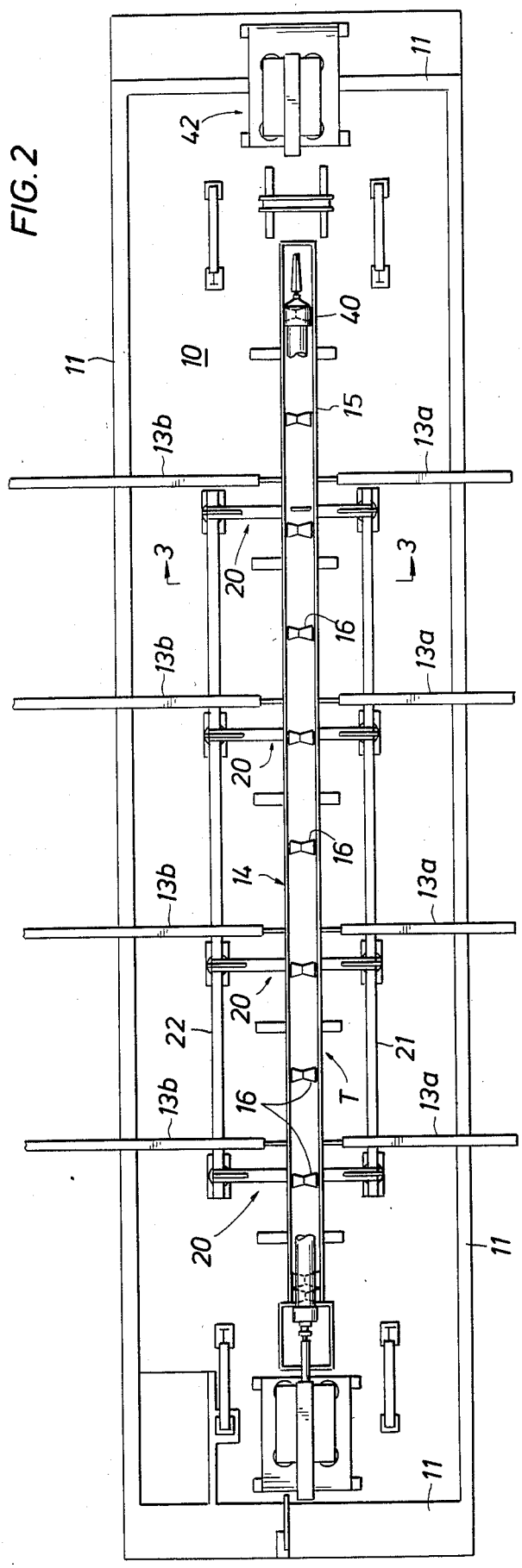
FIG. 2 is a sectional view taken along line 2—2 of FIG. 1 with the middle portion of the pipe broken away to show the pipe conveying system used to move the pipe longitudinally on the test racks.
Figure 1:
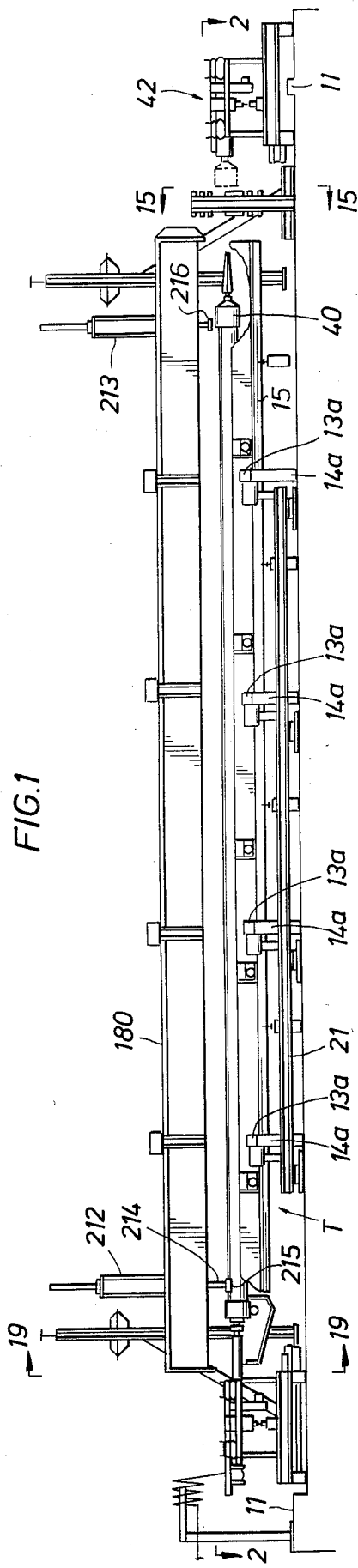
FIG. 1 is a side view, in elevation, of the hydrostatic pipe testing apparatus of this invention supporting a joint of pipe on the test rack with both end caps connected and the shield raised.
Figure 16:
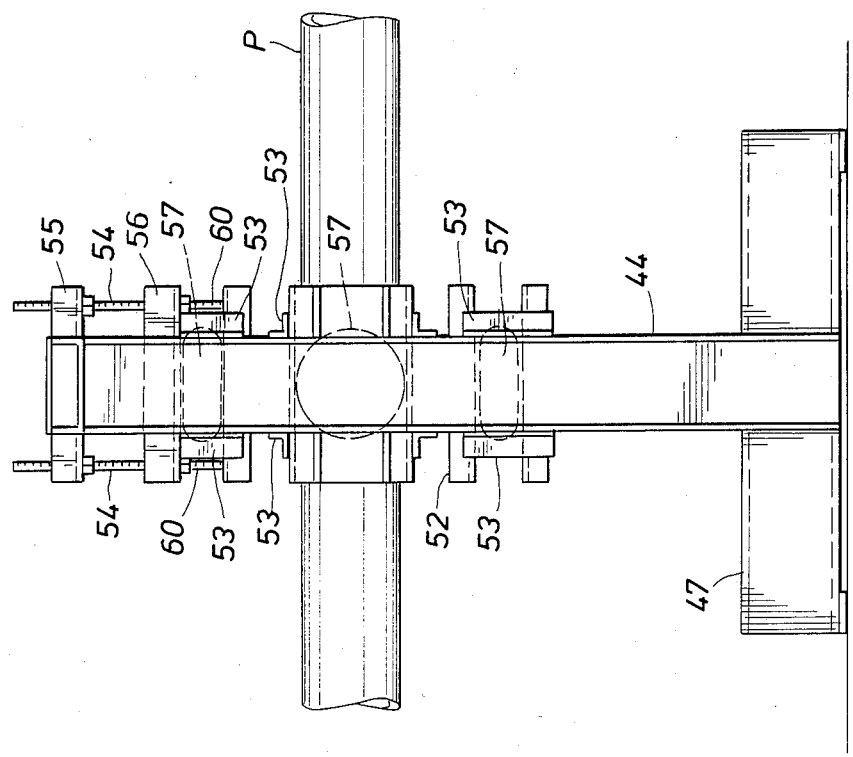
FIG. 16 is a side view of the guiding apparatus of FIG. 15 taken along line 16—16 of FIG. 15.
Figure 15:
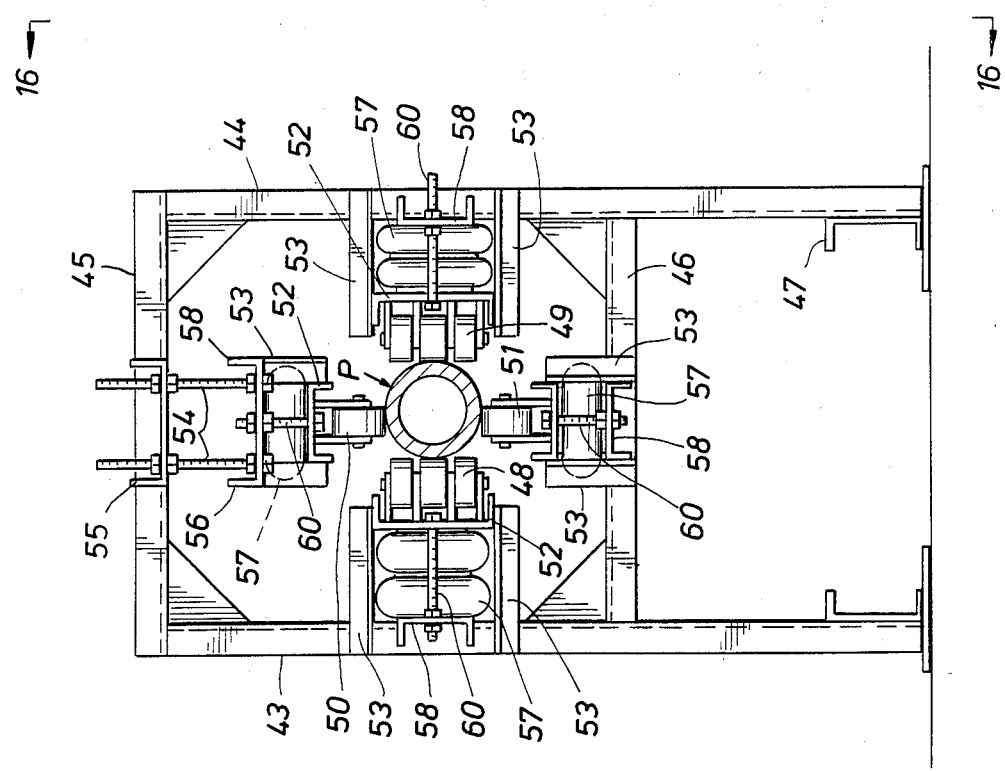
FIG. 15 is a view taken along line 15—15 of FIG. 2 of the apparatus that guides the pipe as it is moved axially into position for an end cap to be connected to and disconnected from the right hand end of the pipe.

In the drawings, the pin end of the pipe is on the right hand side and the box end is on the left hand side, as viewed in FIGS. 1 and 2. To test a joint of pipe after it has been positioned on rollers 16, the first step is to attach pin end cap 40 to close the pin end of the joint. Therefore, tapered rollers 16 move the joint longitudinally into position to receive the end cap from the pin end make and break mechanism, generally indicated by the number 42. The pipe is guided both horizontally and vertically into the desired position by pin end pipe guide assembly 43, the details of which are shown in FIGS. 15 and 16. The guide includes vertical support members 43 and 44 and cross members 45 and 46 that form a substantially square frame, the center of which is generally in line with the path that the pipe will take as it moves longitudinally toward the pin end make and break mechanism. The frame is supported on skid 47. The lateral position of pipe joint "P" is controlled by rollers 48 and 49, while the vertical position of the pipe is controlled by rollers 50 and 51. Each roller is attached to a U-shaped member 52 that varies in size to accommodate the rollers. Each member slides between guide members 53. In the case of side rollers 48 and 49, guides 53 are attached directly to support members 43 and 44. The guide members for lower vertical guide roller 51 are attached to cross member 46. Guide members 53 associated with upper roller 50 are supported in position by tie rods 54 that are attached to U-shaped brackets 55 and 56. Air springs, generally indicated by the number 57, are positioned between base members 58 and the U-shaped members to which the rollers are attached to urge the rollers toward the center of the supporting frame. The distance the air springs can move the rollers toward the center of the frame is controlled by adjustable stops. These stops consist of bolts 60. The heads of the bolts engage U-shaped roller support members 52 the threaded end extends through base members 58 and is equipped with nuts on opposite sides of the base member that can be adjusted to limit the movement of the rollers toward the center of the frame.

In operation, the rollers are carefully positioned to guide the pipe into alignment with the end cap to be connected to the end of the pipe. The rollers should be positioned to slightly clear the largest diameter portion of the pipe in the case of the box end pipe guide. The pin end cap, however, will have a larger diameter than the pipe and, therefore, the rollers for the pin end pipe guide should be adjusted to clear the end cap. A relatively low pressure is then supplied to the air springs, and should a crooked joint of pipe come along, the rollers will gently move to accommodate it without causing the drastic lateral movements of the pipe that would result if the rollers were fixed.

Pin end cap make and break assembly 42 is supported above concrete floor 10 by four support columns 70. Cross beams 71 extend between opposite support columns and support longitudinally extending beams 72, that, in turn, support a plurality of channels 73 that upon which a plurality of ball casters 74 are mounted.

Moving base 75 is supported on the ball casters for movement in any direction. Base 75 includes side channels 76, vertical end plates 77, and top and bottom plates 78 and 79. Channel 80 is attached to front beam 71 and extends forwardly along the longitudinal axis of the assembly to support the cylinder end of hydraulic cylinder 81. Rod 82 of the hydraulic cylinder is attached to moving base 75 to move the base longitudinally left-and-right, as viewed in FIG. 5, on the ball casters.

To move the base laterally, channels 83 are supported on channels 83 by beams 71 along each side of moving base 75. Channels 84 on channel 83 are supported by air cylinders 86. A plurality of ball casters 85 are attached to channels 84 and held against the sides of moving base 75 by air cylinders 86. By varying the pressure in the air cylinders on one side or the other, the positions of the moving base can be adjusted laterally.

Mounted on moving base 75 is a support frame having four vertical legs 90 and horizontal side members 91 that extend between the vertical legs on each side of the assembly. Extending transversely above the frame at each end thereof are cross beams 92 and 93 that are supported on each end by air cylinders 94 and 95, respectively. Suspended from cross beams 92 and 93 and extending along the longitudinal axis of the assembly is shaft support member. Shaft 98 is supported in bearings 99 and 100, for rotation around its longitudinal axis, the bearings being suspended from shaft supporting member 97.

The shaft is rotated by hydraulic motor 101, through sprockets 102 and 103 and drive chain 104. Sprocket 102 is mounted on shaft 98 and sprocket 103 on the drive shaft of motor 101. The motor and sprocket 103 are supported from shaft support member 97 by mounting plates 105 located on opposite sides of the motor.

The height of shaft 98 and shaft support beam 97 above the base is adjusted by hydraulically powered screw jack 110 that rests on the moving base and supports the shaft supporting beam through universal joint 111. The vertical height of shaft 98, and of course, end cap 40 that is in axial alignment with the shaft, needs to be adjusted for different size pipe. This should be done with a joint of pipe in position to receive end cap 40. The angular alignment of shaft 98 and end cap 40 with the pipe is adjusted using inflatable cylinders or springs 94 and 95, which can pivot the shaft and support shaft beam through universal joint 111. This adjustment is required because the test rack is inclined downwardly toward the box end of the pipe where the water is to be introduced so that the high end of the pipe will be at the pin. The inclination of the test rack is about 1/16″ per foot.

Figure 5:
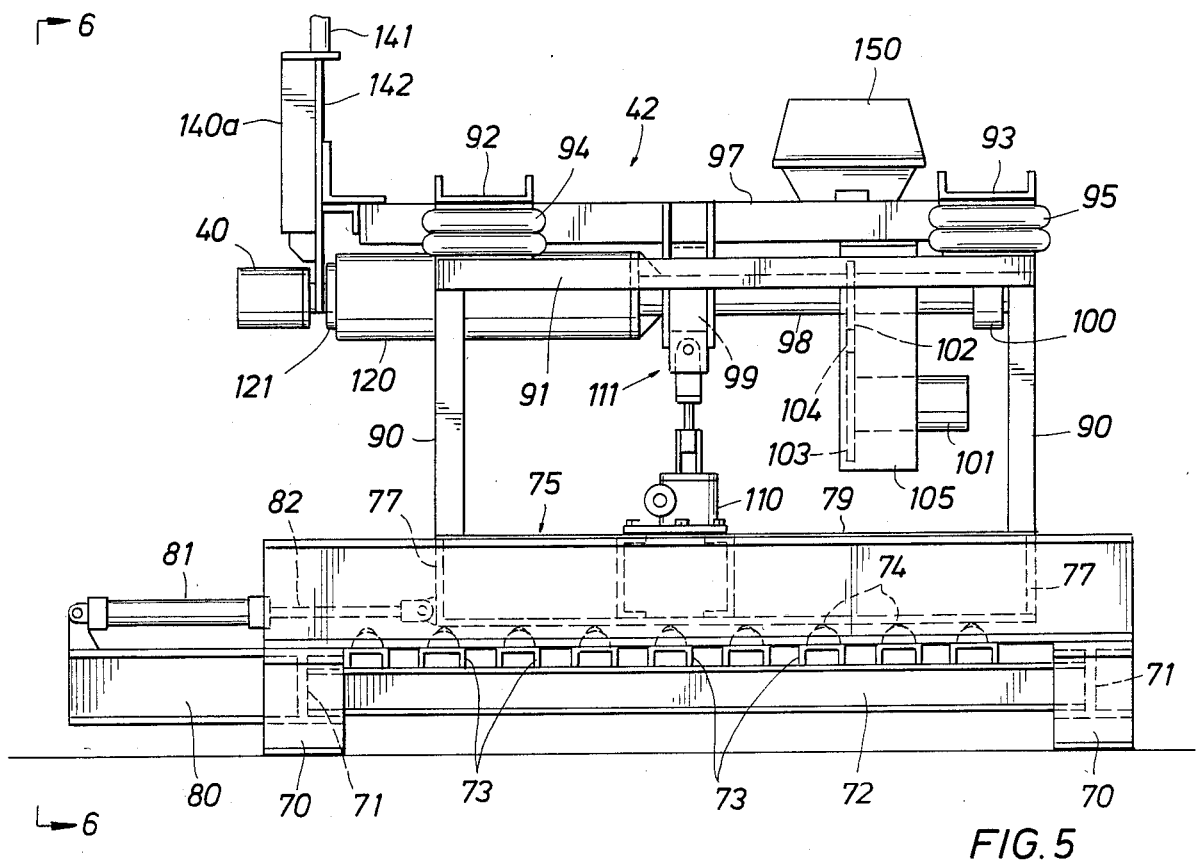
FIG. 5 is a side view, in elevation, of the apparatus for connecting and disconnecting the first end cap.
Figure 6:
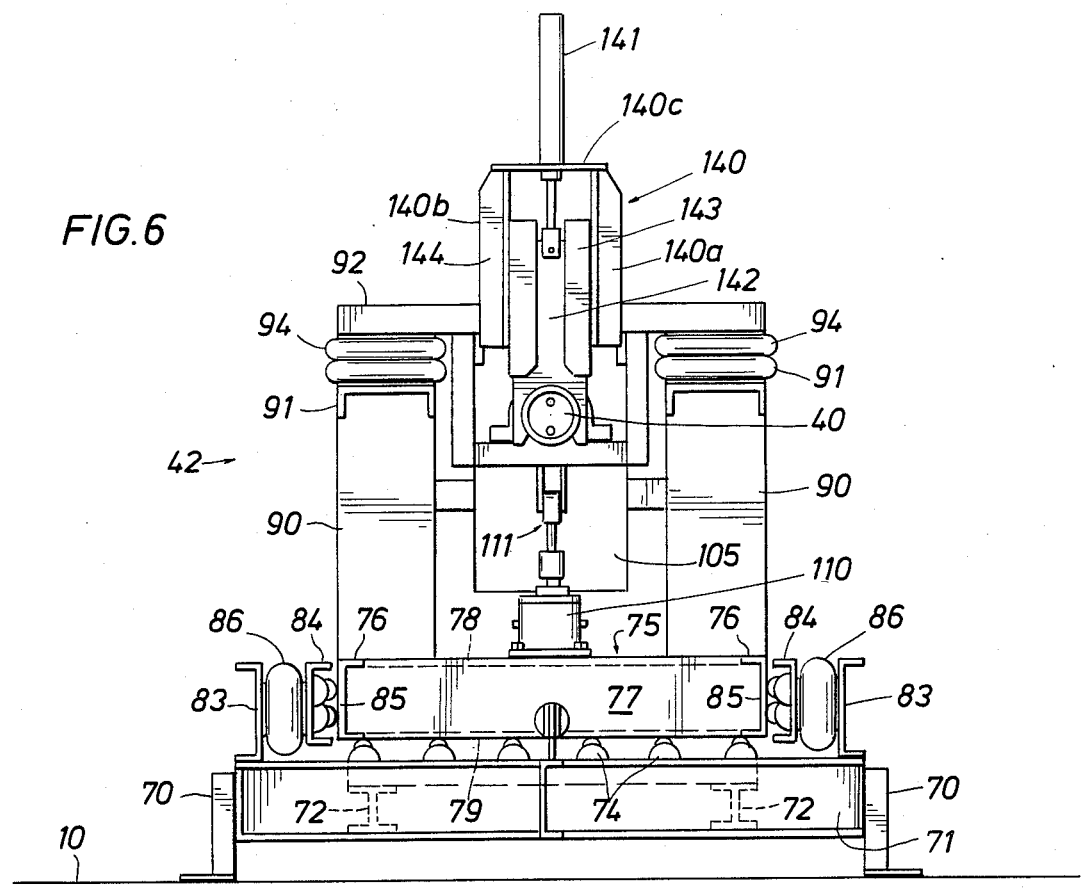
FIG. 6 is an end view of the apparatus of FIG. 5 taken along line 6—6 of FIG. 5.

Shaft 98 rotates end cap 40 through a mandrel and socket assembly. In FIG. 5, the mandrel is positioned in socket 120 with only mandrel flange 121 being shown. The details of the mandrel and socket are shown in FIGS. 7-12.

The socket includes outer shell 120a and molded inner member 120b, which is preferably made of a plastic, such as polyurethane and cast in place in the outer shell. The inner member has tapered opening 120c, that in this embodiment is hexagonal in cross section, as shown in FIG. 9. The socket is mounted on the end of shaft 98, which is in turn supported by bearings 99 and 100 and driven by sprocket 102, as explained above.

End cap 40 is provided with internal threads 40a for mating with the threads on the pin end of the pipe to be tested. On the opposite end of the end cap from the threads, the end cap has central bore 122 that is connected to the inside of the pipe being tested, when the end cap is made up on the pipe, by four passageways 123. Located in bore 122 is valve seat 124 and valve element 125. Coil spring 125a urges the valve element away from seat 124. O-ring seal 124a prevents the flow of fluid between valve seat 124 and bore 122.

Holding the valve seat and valve member in the bore is spacer disc 127, which is bolted to the end of end cap 40 along with mandrel 130 by cap screws 128. Lateral openings 129 in spacer disc 127 allow fluid flowing through the valve seat to escape.

Mandrel 130 includes tubular core 131, which is welded to flange 132. Solid cylindrical spacer 133 is welded to flange 132 on the opposite side and to mounting flange 134. Two lugs 135 are welded to spacer 133 on opposite sides thereof. These lugs extend into slots 136 in annular flange 121 and are welded to the annular flange to secure it on the mandrel. Tubular core 131 is filled with a stack of coil springs 138 after which the end of the tubular core is closed. The outer surface of the tubular core is covered by an outer body 139 of plastic, such as polyurethane. The outer surface of the outer body is tapered at the same angle as the inner surface of opening 120c of the socket 120. It is also hexagonal in cross section so the mandrel will mate with the opening in the socket to form a driving fit between the socket and the mandrel.

Mounted on the front end of shaft support frame 97 is inverted U-shaped support frame 140. It includes two side rails 140a and 140b and a top plate 140c. Mounted on the top plate is hydraulic cylinder 141. The cylinder rod is attached to plate 142 that is biforcated on its lower end and positioned to move between flange 121 on mandrel 130 and pin end cap 40 to hold the mandrel in the socket, as shown in FIG. 5, after the end cap has been removed from the pin end of the pipe at the completion of a test. Guide members 143 and 144 are attached to plate 142 and engage side rails 140a and 140b to guide plate 142 as it moves up and down between the guide rail.

Vibrator 150 is mounted on shaft support beam 97 to supply high frequency—low amplitude vibrations to the shaft and to end cap 40 to provide mechanical lubrication to the threaded connection between end cap 40 and the pin end of the pipe as the connection is made up and broken out. The vibrations also assist the end cap and threads on the pipe to align themselves properly when they engage initially.

Figure 13:
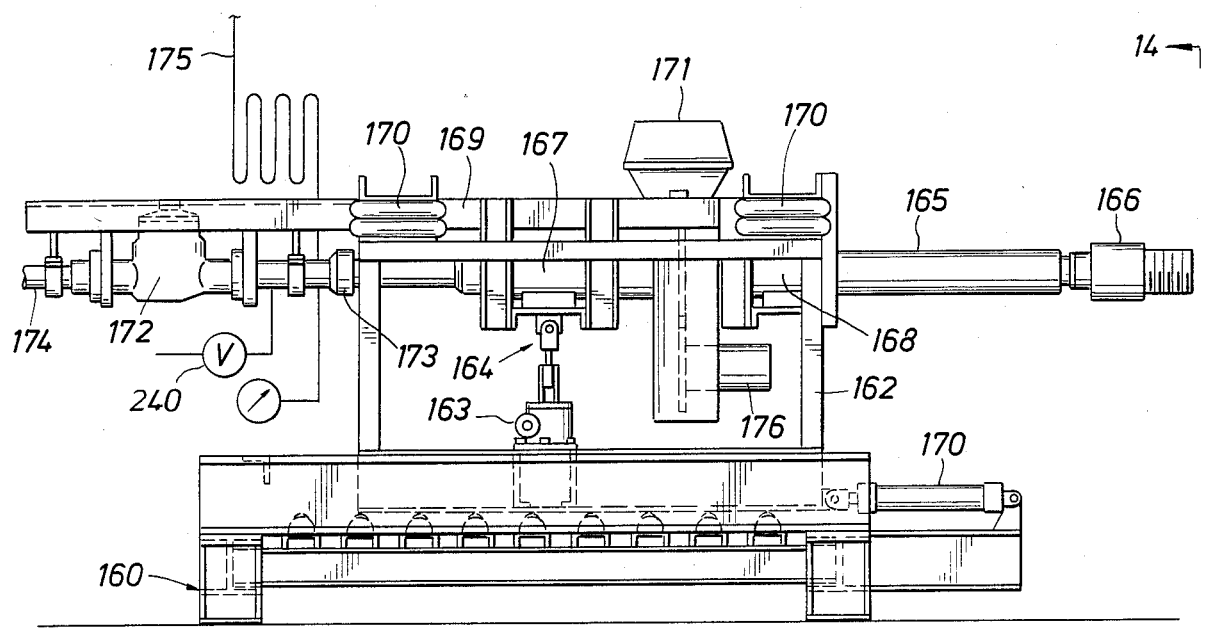
FIG. 13 is a side view in elevation of the apparatus that supports the second end cap, that connects and disconnects the end cap to and from the pipe, and that also supplies the pipe with fill water and with high pressure water to test the pipe.
Figure 14:
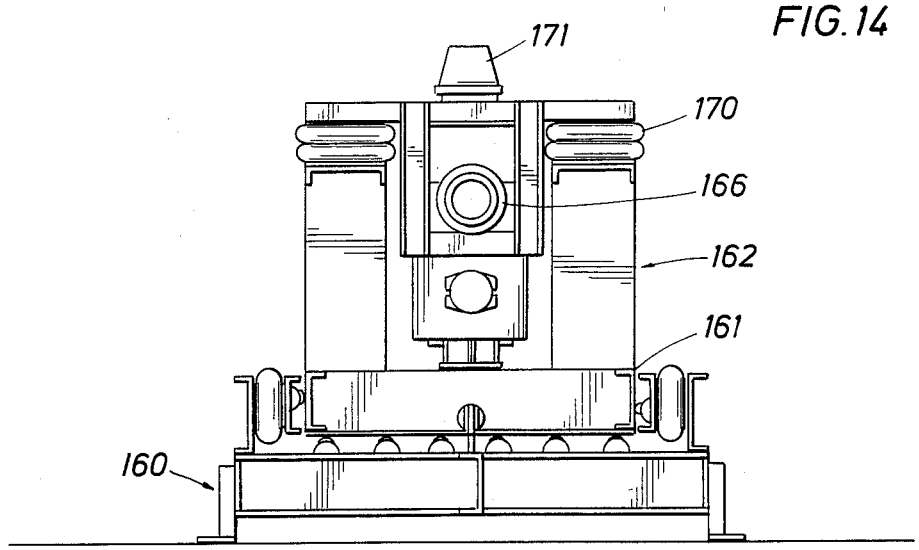
FIG. 14 is an end view of the apparatus of FIG. 13 taken along line 14—14 of FIG. 13.

On the opposite side of the test rack from the pin end cap make and break apparatus is the box end cap make and break apparatus as well as the plumbing required to fill the pipe with water and pressure test the pipe. As best seen in FIGS. 13 and 14, this apparatus includes support skid 160 and moving base 161, which are of the same construction as the skid and moving base for the pin end cap make and break apparatus and will not be further described. The same is true of support frame 162, and screw jack 163 with universal connection 164. Shaft 165, in this case, is hollow as is box end cap 166 since water is going to be pumped through the shaft and the end cap into the pipe. The shaft is supported for rotation on bearings 167 and 168, which in turn are supported by shaft support beam 169 and screw jack 163. The angular inclination of shaft 165 is controlled by inflatable air mounts 170. Hydraulic cylinder 170 moves box end cap 166 on the end of shaft 165 into and out of engagement with the box end of the pipe to be tested. Vibrator 171 provides mechanical lubrication to the threads on the end cap and pipe.

Hollow shaft 165 is connected to check valve 172 through swivel 173. The swivel allows shaft 165 to rotate to make up and break out the end cap and also provide a pressure tight connection through which water can be pumped into the pipe. The water for filling up the pipe initially comes from a low pressure pump (not shown) through a flexible hose connected to the end of nipple 174. Water under high pressure for testing the pipe is supplied through line 175 which is a small diameter high pressure tubing that is shaped into a coil to allow cylinder 170 to move the apparatus back and forth as required to move end cap 166 to the desired positions. Hollow shaft 165 is rotated by hydraulic motor 176 through the same type of chain and sprocket drive used on the other make and break apparatus.

Upper shield 180 is lowered onto the joint of pipe being tested before the high pressure water is applied to the pipe. The shield is made of heavy armor plate type material designed to contain the high pressure stream of water that would be released if the pipe failed as well as any flying pieces of metal. It also is deliberately made heavy so that the weight of the shield on the pipe will keep the pipe from moving due to the reaction from the release of a high velocity stream of water.

Figure 19:
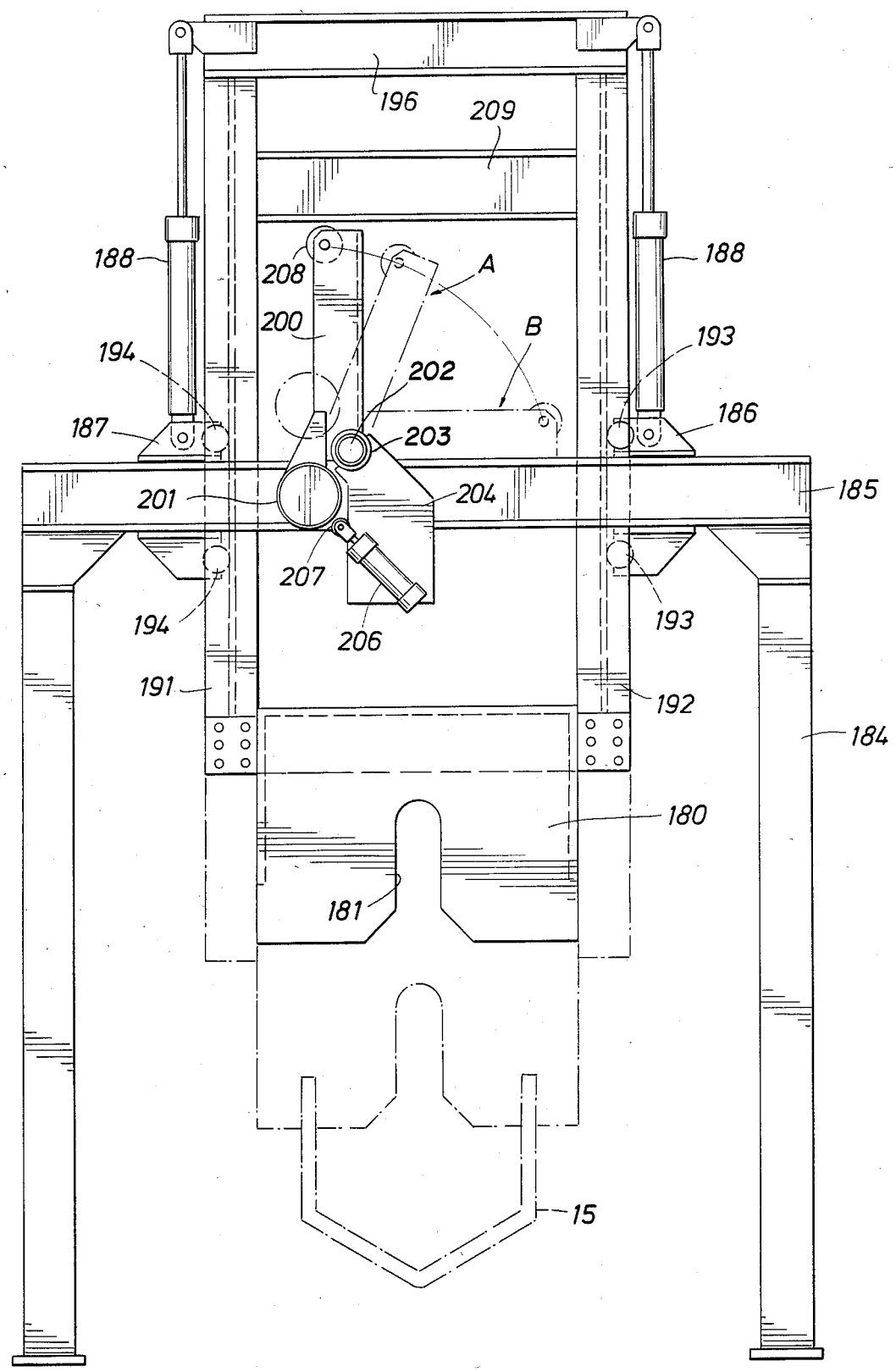
FIG. 19 is a view taken along line 19—19 of FIG. 1 showing, in elevation, the stop employed to insure that the shield does not inadvertently fall from its raised position.

The shield consists of an elongated box that is open on the bottom and closed on each end with the exception of the end adjacent the box end of the pipe. As is shown in FIG. 19, this end has slot 181 through which hollow shaft 165 extends when the shield is lowered onto the pipe. The shield is supported and moved between its up and down positions by the apparatus shown in FIG. 19, one of which is located adjacent each end of the shield. The apparatus includes supporting frame 184, which has two spaced, parallel, upper cross members 185, only one of which is shown in FIG. 19. Guide members 186 and 187 extend between the two cross members 185 and transfer the weight exerted on hydraulic cylinders 188 and 189 to supporting frame 184. Extending upwardly from opposite sides of shield 180 are H-beams 191 and 192, the flange side of which is seen in FIG. 19. Rollers 193 and 194 that are mounted for rotation on members 186 and 187 respectively to engage the webs of beams 191 and 192 between the flanges to guide the H-beams and thereby the shield as it is moved up and down by cylinders 188. The end of the cylinder rods that move the shield are attached to cross member 196 that extends between the upper ends of H-beams 191 and 192.

Since the shield is very heavy, it could cause serious damage to the equipment should it inadvertently fall. It also could cause serious injury to anyone who happened to be hit by it. Therefore, means are provided to hold the shield from inadvertently falling should the hydraulic cylinders 188 fail for any reason. In the embodiment shown, stop arm 200 to which counterweight 201 is attached is mounted for rotation around shaft 202. The shaft is supported for rotation by bearing 203 which is mounted in stationary plate 204. Plate 204 also acts as a stop to limit the distance counterweight 201 can swing in a counterclockwise direction below shaft 202. In other words, it is designed to hold the counterweight in the position shown so that the stop arm will be substantially vertical. Hydraulic cylinder or air cylinder 206 is mounted on plate 204 so that roller 207 on the end of the piston rod will engage counterweight 201, when the rod is extended, and move stop arm 200 to position "A" shown in dotted lines. In this position, as the shield is lowered, roller 208, attached to the upper left hand corner of stop arm 200, will engage cross member 209 and at this angle, the weight of the shield moving downwardly will cause stop arm 200 to continue rotating toward the horizontal position shown in position "B". Usually, before this position is reached, the shield will be all the way down onto the pipe. Upper shield 180 has provided a plurality of arcuate pads 210 spaced along its length that engage the pipe on the test rack when the weight of the shield is transferred to the pipe. Cylinder 206 will then retract roller 207 and when the shield is again raised, counterweight 201 will move stop arm immediately into position to hold the shield from inadvertently falling any further than would be required for cross member 209 to engage the stop arm.

Means are also provided to hold the pipe against rotation as the end caps are connected to and disconnected from the pipe. In the embodiment shown, mounted on shield 180 adjacent each end, are hydraulic cylinders 212 and 213. Cylinder 212 is positioned to extend rod 214 which extends through an opening in the top of the shield downwardly to press holding pad 215 against the pipe to keep it from rotating as box end cap 166 is made up and broken out. Cylinder 213 works in the same manner to hold the pipe from rotating as pin end cap 40 is made up and broken out.

Figure 17:
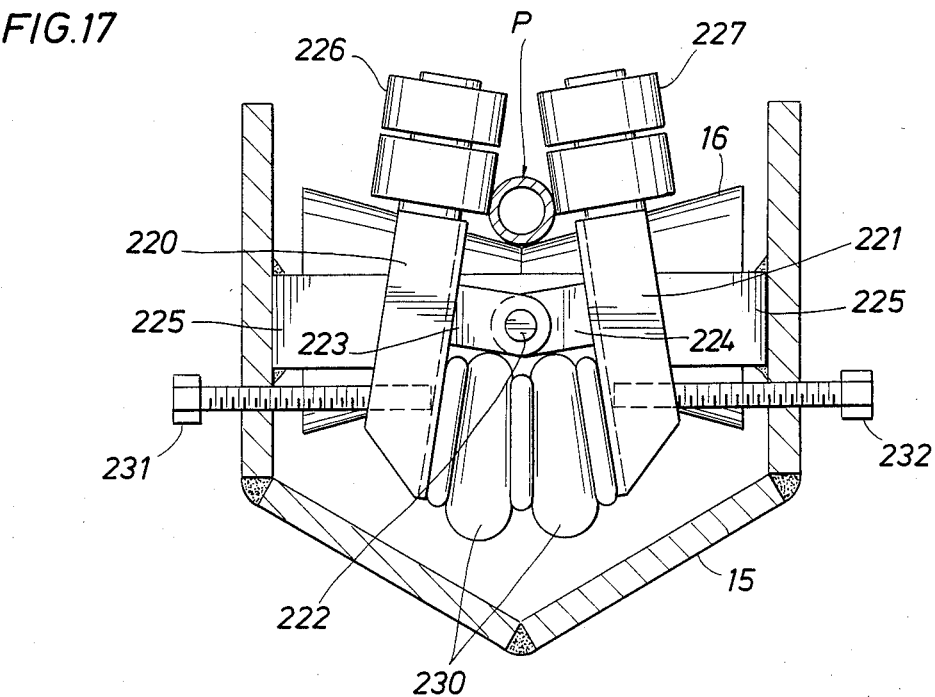
FIG. 17 is a side view of the apparatus that guides the pipe as it is moved longitudinally on the test rack.
Figure 18:
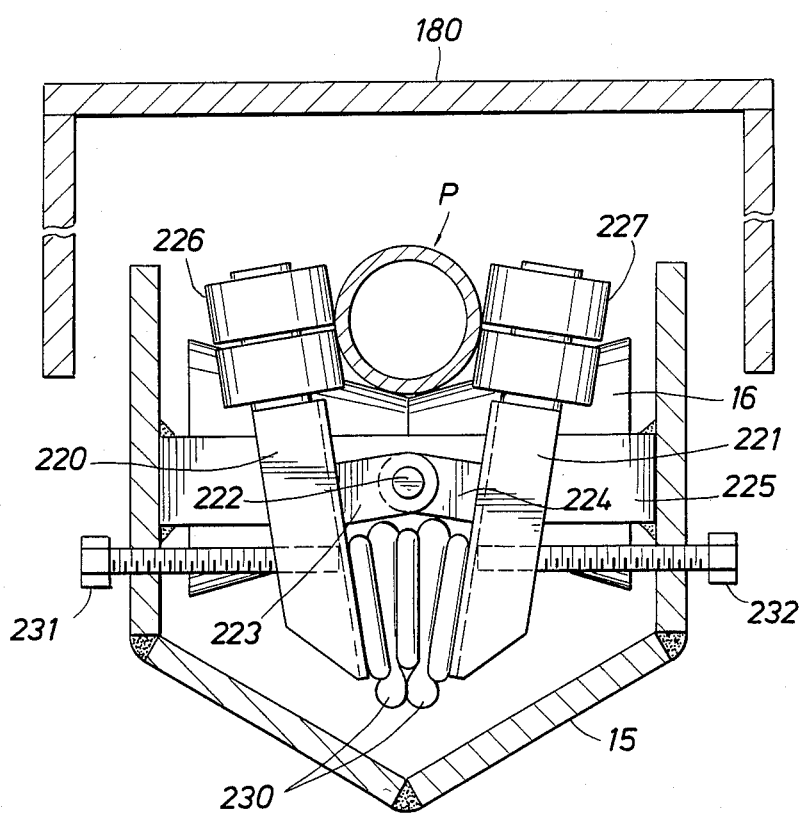
FIG. 18 is another view of the pipe guiding apparatus of FIG. 17 as it guides pipe of a larger diameter than what is shown in FIG. 17.

Means are also provided to guide the pipe along the test rack. In FIG. 17, the guide means is shown guiding a small diameter pipe and in FIG. 18 a relatively larger diameter pipe as it travels along the tapered rollers 16 of the test rack. The pipe guides are located between the tapered rollers, but not necessarily between each tapered roller. It includes two arms 220 and 221 that are connected together by pin 222 that extends through openings in arms 223 and 224 attached to the arms. Pin 222 is connected to cross member 225 that extends between the side walls of lower shield 15 below the upper surface of the tapered rollers. Rollers 226 and 227 are mounted for rotation on the upper ends of arms 220 and 221 to engage the pipe positioned on the tapered roller. Air cylinder 230 is located between the ends of the arms on the opposite side of pin 222 from the rollers to urge the rollers together. Stop rods 231 and 232 which are threaded, are located in tapped holes in the side walls of lower shield 15 and are adjusted for the particular diameter of pipe being handled by the test rack.

In operation, a small amount of air pressure is maintained in the air cylinders to continually urge the rollers together. Stop rods 232 are adjusted to limit the distance the lower ends can be moved apart by the air cylinder so that rollers 226 and 227 will be positioned to be slightly spaced from the pipe as it moves down the center of the test rack. Should an upset or the pipe be so crooked that something has to give, then the rollers can move apart by compressing air cylinder 230.

To test pipe hydrostatically using the apparatus and method of this invention, a joint of pipe is moved on to the tapered rollers of the test rack in the manner described above in connection with the pipe moving apparatus shown in FIGS. 3 and 4. The pipe is then moved by the tapered rollers longitudinally toward pin end make and break apparatus 42 until the pin end of the pipe is positioned adjacent pin end cap 40. The end of the pipe is aligned with end cap 40 by pipe guide apparatus, shown in FIGS. 15 and 16. Hydraulic cylinder 213 moves holding pad 216 into engagement with the pipe. Hydraulic motor 101 is actuated to rotate shaft 98 and end cap 40 to the right, if the threads are right hand, the rotation being transmitted to the end cap through socket 120 and mandrel 130 positioned in the socket. At this point in the operation, cylinder 141 will be holding plate 142 well above flange 121 on the mandrel. The rotation of the end cap at this point will be relatively slow and while it is so rotating, cylinder 81 will slowly move the end cap into engagement with the pin end of the pipe where the threads will engage and the connectors will begin to be made up. At this point, the speed of rotation of shaft 98 and the end cap can be increased, if desired, to speed up the operation. All this time vibrator 150 is operating.

When the hydraulic pressure being supplied to motor 101 indicates that the joint between the end cap and the pipe has been made up, motor 101 is turned off, holding pad 216 is lifted from the pipe, and the tapered rollers on the test rack begin to move the pipe longitudinally toward the box end make and break apparatus. As the pipe is moved away from this pin end make and break apparatus, end cap 40 will pull mandrel 130 out of socket 120 so that the mandrel moves with the pipe. Box end cap 166 is then made up on the other end of the pipe in the same manner with hydraulic cylinder 212 holding the pipe against rotation. When the pressure of the hydraulic fluid to hydraulic motor 176 indicates that the joint is made up, hydraulic cylinder 212 will raise holding pad 215 away from the pipe and upper shield 180 will be lowered until the weight of the shield is transferred to the pipe on the test rack. The fill pump will then start filling the pipe with water from the box end. As the water enters the pipe, air will be displaced from the other end through passageways 123, around and through valve member 125, which is being held in its open position by spring 125a, through the opening in valve seat 124, and to the atmosphere through ports 129. When the pipe is filled with water, the water being substantially denser than air, will force valve member 125 against valve seat 124, compressing spring 125a, and closing the valve in pin end cap 40.

At this time, the high pressure pump will begin to build up the pressure in the pipe through high pressure line 175 to the desired test pressure. This test pressure will be held for a predetermined length of time. If the pipe does not fail or the connections between the pipe and the end caps do not leak, the test is completed. At that point, exhaust valve 240 will be opened and the high pressure fluid will be discharged back to the sump associated with the fill pump. Upper shield 180 is then raised. Hydraulic motor 176 is operated in the reverse direction to bread out box end cap 166 from the pipe. The pipe is then moved longitudinally until mandrel 130 is inserted again in socket 120 in the pin end cap make and break apparatus. The pipe is again held against rotation by hydraulic cylinder 213 and biforcated holding plate 142 is moved down into the position shown in FIG. 5 by cylinder 141. Hydraulic motor 101 then operates in the reverse direction to break the connection between pin end cap 40 and the pipe. The pipe is then moved back to its original position on the test rack and discharged to the drainage section.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. Hydrostatic pipe testing method comprising the steps of moving a threaded pipe joint onto a test rack, supporting a first threaded end cap on a mandrel in a socket, moving the pipe and first end cap longitudinally into engagement, rotating the first end cap through the socket and mandrel to screw the threaded cap on the end of the pipe, moving the pipe with the first end cap and the mandrel longitudinally into position to receive a second threaded end cap, rotating the second end cap to screw it on the end of the pipe, testing the pipe with hydrostatic pressure, rotating the second end cap to unscrew it from the pipe, moving the pipe longitudinally to reinsert the mandrel into the socket, rotating the socket to unscrew the first end cap from the pipe, and moving the pipe from the test rack.

2. The method of claim 1 further including the steps of holding the mandrel in the socket after the first end cap has been unscrewed to keep the end cap from moving with the pipe and moving the pipe longitudinally away from the first end cap.

3. The method of claim 1 further including the step of introducing high frequency, low amplitude vibrations into the end caps as they are screwed on and unscrewed from the ends of the pipe.

4. The method of claim 1 further including the steps of lowering a shield onto the pipe before the pipe is tested to protect personnel and to hold the pipe on the test rack should the pipe rupture under pressure and raising the shield after the test is completed.

5. The method of claim 1 further including the step of supporting the socket on inflated flexible wall cylinders to allow lateral movement of the socket, mandrel, and first end cap as required to orient the threads on the cap for properly engaging the threads on the pipe when the pipe is moved into engagement with the end cap.

6. Hydrostatic testing apparatus for threaded pipe comprising a test rack for supporting the pipe being tested, a first and second threaded end caps for connecting to opposite ends of the pipe through which the pipe can be filled with water under pressure to test the pipe, means for rotating the end caps to make-up and break-out the threaded connections between the pipe and the end caps, guard means to substantially cover the pipe while it is being tested, and means to lower the guard means onto the pipe to hold the pipe on the test rack should the pipe fail while being tested and to raise the guard means out of the way after the test is completed.

7. The apparatus of claim 6 further provided with a safety arm, means mounted the arm below the guard means for pivotal movement between a vertical position to prevent the guard from inadvertently moving toward the pipe on the test rack and a position to allow such movement, a counterweight attached to the arm to constantly urge the arm to its vertical position, and remotely operated means for moving the arm from its vertical position to allow the guard means to move downwardly to rest on the pipe on the test rack.

8. Hydrostatic testing apparatus for threaded pipe comprising a test rack for supporting the pipe to be tested, a first threaded end cap for closing one end of the pipe, means for moving the pipe and first end cap into position to make-up a threaded connection between the threaded end cap and the threaded end of the pipe, means to rotate the end cap to make-up the connection, said means including an elongated mandrel attached to the first end cap and extending along the longitudinal axis of the first end cap, a socket positioned to receive the mandrel and form a driving connection therebetween, and means to rotate the socket to rotate the first end cap to make-up and break-out the threaded connection between the first end cap and the pipe, a second end cap, means for moving the pipe longitudinally with the first end cap attached to move the mandrel out of the socket and to position the other end of the pipe and the second end cap in position to be connected, means for rotating the second end cap to make-up the threaded connection between the pipe and the second end cap, means for testing the pipe with water under pressure supplied through one of the end caps when both ends of the pipe are closed by the caps, means for breaking-out the threaded connection between the pipe and the second end cap, means for moving the pipe longitudinally to insert the mandrel into the socket, and means for rotating the socket to break-out the first end cap.

9. The testing apparatus of claim 8 in which the means to rotate the socket and the second end cap are mounted on flexible wall inflated members to allow lateral and axial adjustment of the end caps as required to align the threads thereon with the threads on the pipe.

10. The testing apparatus of claim 8 further provided with means for guiding the pipe as it is moved longitudinally into position to make up the threaded connections between the pipe and the end caps, said pipe guiding means including rollers for engaging the pipe on opposite sides and inflated flexible wall cylinders for urging the rollers into engagement with the pipe to allow the rollers to adjust to irregularities in the pipe and to allow the pipe to move as required to align the threads therein with the threads on the end caps.

* * * * *